(12) United States Patent
McMahon (10) Patent No.: US 12,306,423 B1
(45) Date of Patent: May 20, 2025

(54) SENSOR ACTIVATED ANTI-COLLISION DEVICE

(71) Applicant: Kevin Patrick McMahon, Plano, TX (US)

(72) Inventor: Kevin Patrick McMahon, Plano, TX (US)

(*) Notice: Subject to any disclaimer, the term of this patent is extended or adjusted under 35 U.S.C. 154(b) by 376 days.

(21) Appl. No.: 17/967,879

(22) Filed: Oct. 17, 2022

Related U.S. Application Data (63) Continuation-in-part of application No. 17/402,283, filed on Aug. 13, 2021, now Pat. No. 12,123,973.

(60) Provisional application No. 63/065,207, filed on Aug. 13, 2020.

(51) Int. Cl.
| | |
|---|---|
| *G02B 5/124* | (2006.01) |
| *G01S 7/02* | (2006.01) |
| *G01S 7/481* | (2006.01) |
| *G01S 13/931* | (2020.01) |
| *G01S 17/931* | (2020.01) |

(52) U.S. Cl.
CPC .............. *G02B 5/124* (2013.01); *G01S 7/027* (2021.05); *G01S 7/481* (2013.01); *G01S 13/931* (2013.01); *G01S 17/931* (2020.01); *G01S 2013/9329* (2020.01)

(58) Field of Classification Search
CPC ....... G02B 5/124; G01S 17/931; G01S 7/027; G01S 7/481; G01S 13/931; G01S 2013/9329; G01S 7/411; G01S 7/028; H01Q 15/18; H01Q 15/23

See application file for complete search history.

(56) References Cited

U.S. PATENT DOCUMENTS

| | | | | |
|---|---|---|---|---|
| 3,684,348 A | * | 8/1972 | Rowland ................ | G02B 5/124 359/530 |
| 2001/0017731 A1 | * | 8/2001 | Smith .................... | G02B 5/124 359/530 |
| 2009/0027775 A1 | * | 1/2009 | Nilsen .................... | G02B 5/124 359/530 |
| 2016/0299224 A1 | * | 10/2016 | Stobbe .................. | B60Q 9/008 |
| 2022/0216616 A1 | * | 7/2022 | Kim ....................... | H01Q 15/23 |

\* cited by examiner

*Primary Examiner* — Vladimir Magloire
*Assistant Examiner* — Yonghong Li
(74) *Attorney, Agent, or Firm* — Snell & Wilmer LLP (57) ABSTRACT

A reflective device that greatly enhances the detectability and signal processing capabilities of object detection sensors to detect, recognize, classify, and track small aspect ratio targets like cyclists, pedestrians, and other vulnerable road users (VRU's). Enhanced object detection is achieved by the application of a novel hybrid reflective surface where prismatic and metalized materials have been altered into a composite and affixed to a specified geometric surface that optimizes the quality and quantity of raw object detection signal data obtained from individual sensors and the collective group of sensors when the data is fused. It is the simultaneous optimization of the raw signal data being transmitted from each of the sensor modalities (radar, camera-vision, and lidar) through the enhanced illumination and reflectivity techniques and materials described above that produces the increased Signal-to-Noise ratio that elevates the visibility of the target object well above the noise threshold to appear on the relevant object list of the collision avoidance system.

18 Claims, 10 Drawing Sheets

SENSOR ACTIVATED ANTI-COLLISION DEVICE

CROSS-REFERENCE TO RELATED APPLICATIONS

This Non-Provisional application is Continuation-in-Part of U.S. Non-Provisional Application No. 17,402,283 entitled "Radar Activated Anti-Collision Device" filed Aug. 13, 2021 which claims benefit to U.S. Provisional Application No. 63/065,207 entitled "Radar Activated Anti-Collision Device" filed Aug. 13, 2020.

TECHNICAL FIELD

The subject of this invention pertains to the detection of objects and the prevention of collisions between vehicles who must share roadways. Specifically, the present invention provides methods and devices that greatly enhance the detectability and signal processing capabilities of object detection sensors to detect, recognize, classify, and track small aspect ratio targets like cyclists, pedestrians, and other vulnerable road users (VRU's). Enhanced object detection is achieved by the application of a novel hybrid reflective surface where prismatic and metalized materials have been altered, combined, and fused into a new composite material and affixed to a specified geometric surface that optimizes the quality and quantity of raw object detection signal data obtained from individual sensors and also from the collective group of sensors when the data is combined and analyzed by the vehicles' collision avoidance system (CAS).

BACKGROUND

It is well known that modern vehicle safety technologies are designed to alert operators and their vehicles about the presence of other vehicles in order to avoid collisions between vehicles and other objects on roadways. These collision avoidance systems (CAS) utilize a suite of object detection sensors including radar, camera-vision, and 3-D laser scanning (LIDAR) and optics technologies that comprise a vehicle's driver assistance capabilities. In particular, radar and camera-vision sensors are a fundamental base technology present on virtually all vehicles with driver assistance capabilities. Fitment of collision avoidance systems is now near universal, and by October 2022, all the major vehicle manufacturers will have met their commitment to the federal government for making Forward Collision Avoidance (FCW) and Automatic Emergency Braking (AEB) systems standard equipment on all vehicles sold in the U.S. Additionally, the European Union has essentially mandated the fitment of AEB on all cars sold in Europe since 2018 through its EuroNCAP program. China, Japan, Australia, Canada, South America, and the UK have followed the EU directive since 2020. Further, the growing global development, testing and deployment of automated vehicles is dependent on the application and perfection of collision avoidance technologies.

A range of vehicles and objects of all size, weight, and manner utilize and interact on roadways, streets, pathways, and thoroughfares. The relative differences in the speed, location, distance, size, shape, visibility, and presence of the various vehicles that collectively inhabit roadways makes collision-free travel a constant challenge. In the U.S. alone, over 40,000 people die in vehicle-related crashes each year (1.35 million deaths worldwide). The relative differences in the speed and size of vehicles and other objects, like cyclists and pedestrians, that must share roadways makes lack of visibility and detection a key contributor to vehicle crashes and fatalities. Cognizant of this challenge, the global automotive industry has committed significant engineering skill and financial resources to developing technologies that increase the vehicle and object detection capabilities of modern cars and trucks.

Over the last fifteen years, the automotive industry has developed collision warning systems that utilize a suite of object detection sensors including radar, camera-vision, and sometimes lidar that comprise a vehicles driver assistance package. These sensors, both individually and collectively, serve as the fundamental base technology present on virtually all vehicles with driver assistance capabilities and serve to detect objects in the vehicles pathway and warn the operator and/or the vehicle in order to avoid collisions.

Despite the foregoing, technological limitations like directional sensitivity and signal strength inherent in collision avoidance systems restrict the ability of collision avoidance sensors to view and detect target objects at off-angles, wide fields-of-view, at certain distance/range measurements and various environmental conditions. As a result, typically only large metallic or illuminated target objects can be sufficiently perceived by the object detection sensors to trigger the warning to the driver and/or the vehicle's collision avoidance system. There exists an even greater challenge when seeking to detect small aspect ratio targets like cyclists and pedestrians who typically have minimal radar cross section (RCS) return signatures and low object illumination characteristics. The failure of human operators and collision avoidance systems to detect small targets has led to almost 1,000 deaths and 50,000 injuries a year to cyclists, and nearly 6,000 deaths and 137,000 injuries a year to pedestrians, in the U.S. alone. The cost of these fatalities and injuries is over $4 billion annually and growing.

Large numbers of motor vehicles operating on roadways now include sophisticated collision avoidance systems (CAS) to assist drivers. CAS utilizes a group of object detection sensor modalities to detect, classify and track objects in the vehicles field of view and activate visual and audible warnings to the driver, like a Forward Collision Warning (FCW) functionality, and/or activate an Automatic Emergency Braking (AEB) functionality.

Although vehicle-based object detection has developed and improved over the years, the detection of small aspect ratio targets like pedestrians and cyclists has remained a persistent challenge or "edge case" for vehicle manufacturers and CAS system suppliers. Vehicle CAS systems detect large objects like other cars and trucks very well, as they are large metallic objects. However, due to the relatively modest size, shape, orientation, composition (low reflectivity) and unpredictable pathways of pedestrians and cyclists, vehicle CAS systems a difficult time reliably seeing and reacting to them (see recent AAA and IIHS studies on FCW/AEB performance with pedestrians and cyclists). Cyclists are the most difficult edge case because, unlike pedestrians, they more often must share the road with vehicles and can move more quickly in very unpredictable ways. Environmental factors (weather, time of day, level of congestion) make cyclist detection even more challenging. Growing cyclist fatality and serious injury rates demonstrate the on-going challenges of protecting cyclists from collisions with motor vehicles.

What would be desirable would be an apparatus that allows vehicles with collision avoidance systems to reliably detect cyclists, pedestrians, and other small aspect ratio targets by amplifying and illuminating their detectability and therefore greatly improving the capability of the various object detection sensor modalities to enhance the performance of FCW and AEB functionalities. Doing so will greatly improve the safety of cyclists who must share the road with motor vehicles.

SUMMARY OF THE INVENTION

The apparatus of the present invention utilizes (principles of Prizmatic Optimization) to significantly enhance the capability of various object detection sensors to detect small aspect ratio targets, like cyclists, pedestrians, and other vulnerable road users (VRU's) and thereby cause vehicle collision avoidance systems to improve performance by increasing the visibility of cyclists and others to those systems. The present invention includes the application of technologies and techniques utilizing altered reflective materials that when combined formulated into a new composite material and mounted on surface areas with specific geometric configurations produces enhanced illumination and reflectivity to object detection sensors. Those sensors then convey higher quality raw signal data that is received and processed by vehicle electronic control units and decisional algorithms to initiate actuators that control the activation of Forward Collision Warning (FCW) and Automatic Emergency Braking (AEB) functionalities.

Prismatic Optimization combines certain illumination and reflective properties (prismatic, cubic, geometric) that function within the electromagnetic spectrum to enhance the detectability of small aspect ratio targets. Our research, application, and testing have produced optimized object detectability to vehicle CAS systems by enhancing the raw signal data (quality and quantity) that each individual sensor modality (radar, camera-vision, lidar, and optical) processes and transmits to the relevant ECU and decisional algorithms that determine fire/no fire activation decisions for the FCW and AEB functionalities.

It is common knowledge within the automotive safety industry that object detection of small aspect ratio targets, like cyclists, pedestrians, and other vulnerable road users constitutes a challenging "edge case" because the raw signal data being returned from these targets to the individual sensor modalities is typically weak, inconsistent, incoherent, and therefore often well below the detection threshold needed to be effectively transmitted to the ECU and decisional algorithms. This results in poor CAS system performance which endangers the safety of cyclists and other VRU's.

Much of the underperformance of existing CAS systems to detect cyclists and other VRU's results from the unique and difficult reflective characteristics of small aspect ratio targets. Their small profile, their odd and sometimes arbitrary orientation within the vehicle's field of view, relatively low metal content, poor angular resolution, and often unpredictable path of travel, all combine to produce weak, inconsistent, and incoherent raw signal data for transmittal to the ECU and decisional algorithms. Therefore, the diminished quality and quantity of raw signal data significantly degrades the Signal-to-Noise (SNR) ratio which leads to CAS system underperformance.

The practical impact of raw signal data degradation and the consequent lower Signal-to-Noise ratio results in more false positive and false negative object detection instances. Additionally, the CAS system may receive more contradictory raw signal data sensor inputs, both at the individual sensor stage, and/or at the collective sensor fusion stage. This can result in a "cancelling out" phenomenon where confusing and conflicting raw signal data is transmitted and analyzed by the ECU and decisional algorithms which can lead to CAS system failures.

Radian has developed the present invention which comprises a composite material that when applied in various form-factors optimizes for object detection sensor modalities operating on the electromagnetic spectrum. Doing so, enhances the visible light and near-infrared illumination of target objects to camera-vision, optic, and lidar sensors; and improves the micro-wave reflectivity of target objects to radar sensors. It is the simultaneous optimization of the raw signal data being transmitted from each of the sensor modalities (radar, camera-vision, and lidar) through the enhanced illumination and reflectivity techniques and materials described above that produces the increased Signal-to-Noise (SNR) ratio that elevates the visibility of the target object well above the noise threshold to appear on the relevant object list for detection by the vehicles CAS system.

Prismatic Optimization technologies and techniques act to improve the quality and quantity of raw signal data which significantly improves the Signal-to-Noise ratio (SNR) well above the noise threshold and well within the detection threshold. Doing so improves the detectability of the target objects and thus improves the performance of the CAS system to activate the FCW/AEB functionalities to protect cyclists and other VRU's. Our approach can be summarized as utilizing a new novel composite reflective material designed to optimize the quality and quantity of raw signal data returned to various sensor modalities on the front end of the analysis of raw signal data, which produces better CAS performance on the back end.

An apparatus according to the present invention is discussed in detail below in conjunction with the drawings listed below. As will be evident, the apparatus overcomes the disadvantages of the prior art and provides a significant improvement in the field of collision avoidance and object detection.

Advantages

A first advantage of the present invention is that it significantly increases the likelihood that the operator and/or the vehicle equipped with a collision avoidance system will be alerted to the presence of a small aspect ratio target at multiple angles, orientations, distances and ranges. By increasing the quality and quantity of the raw signal data returned from the signal, the apparatus of the present invention appears to the transmitting device to be a much larger, more visible and detectable target. The subsequent increase in object detectability will enable the automotive collision avoidance system, within a sooner time period, and at greater range, distance, and wider field of view, to better detect the presence of the cyclist, pedestrians, or other small aspect ratio targets, thereby greatly increasing the ability of the operator and/or the vehicle to activate the FCW and AEB functionalities to avoid a collision.

A second advantage of the present invention is that it utilizes technologies and techniques to improve the quality and quantity of raw signal data which significantly improves the Signal-to-Noise ratio (SNR) well above the noise threshold and well within the detection threshold. Doing so improves the detectability of the target objects and thus improves the performance of the CAS system to activate the FCW/AEB functionalities to protect cyclists and other VRU's.

A third advantage of the present invention is that it is cost effective. This is evident since the apparatus may be made from a variety of materials such as aluminum, sheet metal, plastics, and include various films, tapes, coatings that are optimized for visible light and near-infrared illumination and radar reflectance. Additionally, various geometric shapes can be utilized in conjunction with coating materials to optimize the individual and collective return signal performance.

A fourth advantage of the present invention is that while the preferred embodiment is applicable to bicycles, motorcycles, e-scooters and other similar vehicles, it is also suited for other users including: pedestrians, and joggers by being affixed to extremities like arms and legs; and to equipment like arm bands; leg bands; helmets; headbands; caps; backpacks, and attached to clothing or fabric; or otherwise embedded into a target object.

A fifth advantage of the present invention is that its utility is based upon a novel device that greatly enhances the detectability and signal processing capabilities of object detection sensors to detect, recognize, classify, and track small aspect ratio targets like cyclists, pedestrians, and other vulnerable road users (VRU's). Enhanced object detection is achieved by the application of a novel hybrid reflective surface where prismatic and metalized materials have been altered and merged into a composite and affixed to a specified geometric surface that optimizes the quality and quantity of raw object detection signal data obtained from individual sensors and the collective group of sensors when the data is fused. The device includes unique and specific configurations and geometries of singular or multiple corner reflectors and the application of prismatic retro-reflective materials altered for functional optimization in all relevant environmental, lighting, and spatial perception conditions, each apparatus can significantly increase and amplify the presence and detectability of target objects at multiple angles, orientations, distances and ranges to the vehicles collision avoidance radar system.

Various implementations according to the present invention are described herein in conjunction with the drawings listed below. As will be evident, the apparatus of the present invention overcomes the disadvantages and omissions of the prior art and provides significant novel improvement in the field of collision avoidance and object detection.

REFERENCE LISTING OF THE NAMED ELEMENTS 100 reflective device
101 composite material
102 first layer
104 second layer
106 transparent layer
107 apertures
108 radar reflective surface
110 micro-prism
116 polyhedral body
117 trihedral portion
120 edge
122 face
124 vertex
126 attachment member
128 conventional reflector
130 framework
132 helmet
134 apparel article
200 roadway
300 vehicle
400 small aspect ratio target

Definitions

In the following description, the term "detecting object" refers to a vehicle equipped with collision avoidance sensors that use any single sensor or combination of radar, camera-vision, and lidar or various electromagnetic emissions in order to detect another vehicle, a pedestrian, motorcyclist or bicyclist, in proximity to the target vehicle. The term "raw signal data signature" is a profile of a target obtained by sensors of a Collision Avoidance System (CAS), by utilizing various modalities such as, but not limited to: lidar, radar, camera imaging. It should be understood that the term "small aspect ratio target" as used in this disclosure, means generally "difficult to detect" and is used in that sense irrespective of the type of sensor(s), e.g., radar, lidar, camera, etc., of any particular CAS. The term "background noise" refers to electromagnetic interference (EMI) or ambient electromagnetic noise that interrupts, obstructs or degrades the functioning of electronics. EMI can be both natural, e.g., thunderstorm, and artificial, e.g., intermodulation and is specifically defined by the International Telecommunication Union (ITU) as "the effect of unwanted energy due to one or a combination of emissions, radiations, or inductions upon reception in a radio communication system, manifested by any performance degradation, misinterpretation, or loss of information which could be extracted in the absence of such unwanted energy." The term "signal-to-noise ratio" is a measure comparing a level of desired signal data to the level of background noise. A "retro reflector" is a device or surface that reflects radiation back to its source with minimum scattering, of which a corner cube reflector is a subset. A trihedral reflector is a type of corner cube reflector with a set of three perpendicular reflective surfaces. Unless otherwise explained, any technical terms used herein have the same meaning as commonly understood by one of ordinary skill in the art to which this disclosure belongs. The singular terms "a", "an", and "the" include plural referents unless the context clearly indicates otherwise. Similarly, the word "or is intended to include "and" unless the context clearly indicates otherwise. Although methods and materials similar or equivalent to those described herein can be used in the practice or testing of this disclosure, suitable methods and materials are described below. The term "comprises" means "includes." All publications, patent applications, patents, and other references listed in this disclosure are incorporated by reference in their entirety for all purposes. In case of conflict, the present specification, including explanations of terms, will control. In addition, the materials, methods, and examples are illustrative only and not intended to be limiting.

DETAILED DESCRIPTION OF THE EMBODIMENTS

As described briefly above, the apparatus of the present invention substantially enhances the likelihood of avoiding collisions between motor vehicles (cars and trucks) and small aspect ratio target objects like bicycles and other mobility devices at any practical angle of orientation and practical distance. Due to the high rate of closure speed between motor vehicles and a smaller object on the roadway (e.g. cyclists and pedestrians), the distance between the vehicle and the object decreases quickly. This rate of closure, the relative size and low reflectivity of the target object, and the distance and angle orientation between the vehicle and the target object makes it very difficult for the vehicle collision avoidance system to detect the target object. Failure of the vehicle collision avoidance system to detect small aspect ratio targets, like cyclists and pedestrians, leads to fatal collisions and significant injuries between vehicles and target objects.

Figure 1A:
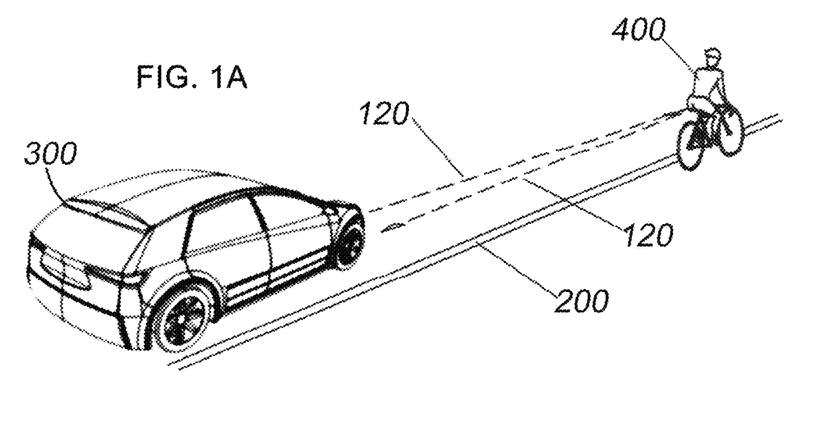
FIG. 1A is a generalized diagram that shows an example problem scenario addressed by implementations according to the present invention.
Figure 1B:
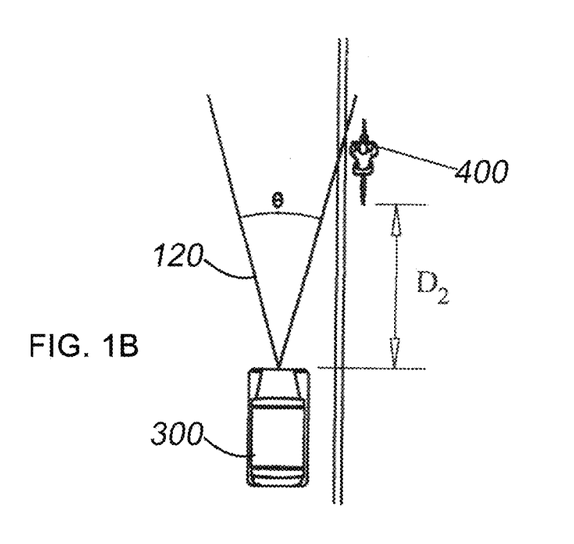
FIG. 1B is a generalized diagram of a vehicle with contemporary automotive radar technology approaching a target cyclist in a typical case where the cyclist is lacking any implementation according to the present invention.

FIG. 1A illustrates a problem to be solved and shows a vehicle (300) traveling on a road surface (200) approaching a target object from various angles. In this instance, the target is a cyclist (400), but other small aspect ratio targets would include motorcycles, e-scooters, mobility devices, wheelchairs, pedestrians and other similar objects. As can be seen in (FIG. 1B), a cyclist (400) is shown operating without the apparatus of the present invention, and without augmented raw signal data signature that would otherwise be provided by various implementations according to the present invention. Accordingly, the cyclist's presence will often not be detected by the vehicle CAS sufficiently to activate a warning to the operator and/or the vehicle (300) to avoid collisions with the bicycle or other similar mobility device. For example, in this particular case, being off-angle and/or of small aspect ratio, the cyclist will have an RCS signature or a lack of illumination that by itself is insufficient to activate the vehicles collision avoidance system. This is especially true at high vehicle to target object closing speeds and substantial range distances.

Figure 2:
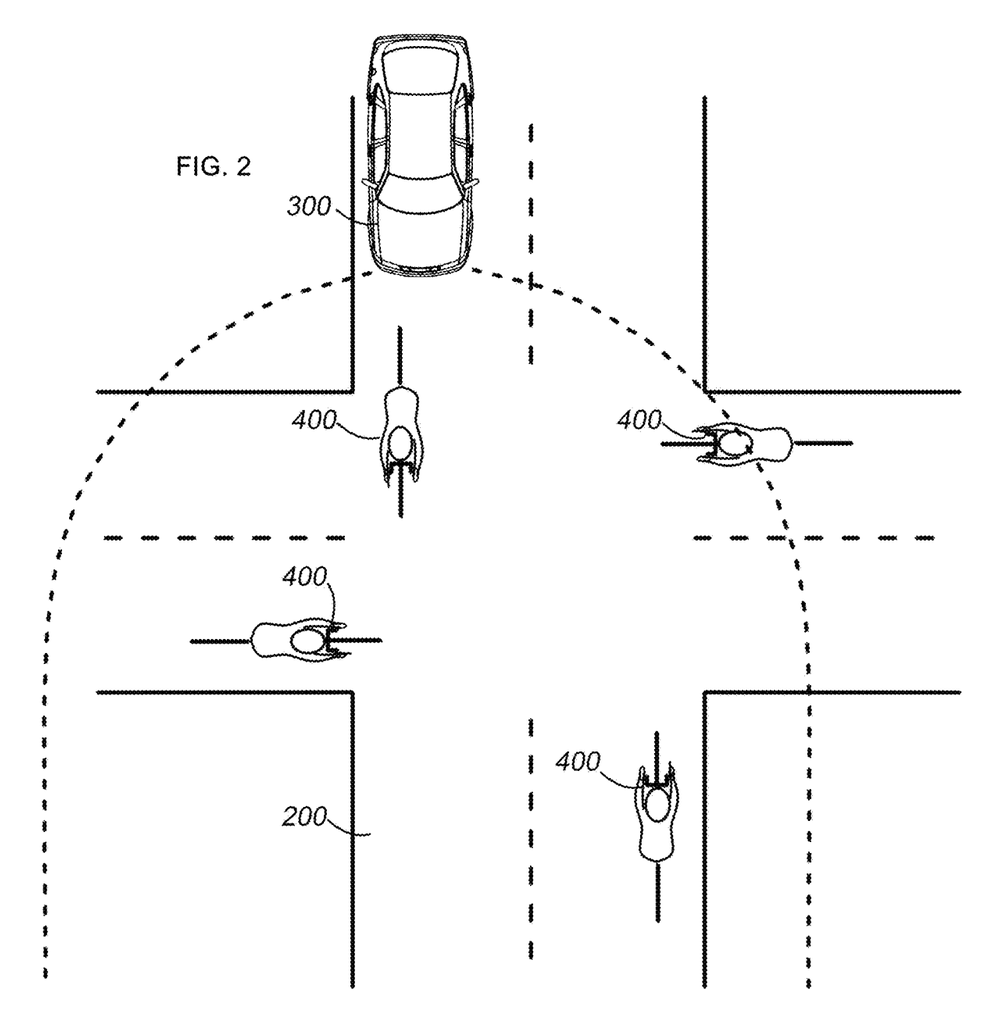
FIG. 2 is a diagram illustrating the ability of an example implementation according to the present invention, of a corner reflector design, geometries, and application of the present invention to signal the presence of small aspect ratio targets (e.g. cyclists) that are located in multiple distances, angles, orientations, ranges, and fields-of-view to vehicles with collision avoidance systems.

FIG. 2 shows a vehicle (300) traveling on a road surface (200) approaching multiple target objects (400) from various proposed angles. In this instance, the target is a cyclist, but other small aspect ratio targets would include motorcycles, mobility devices, wheelchairs, pedestrians and other similar objects. The cyclist can be moving in any four directions, and at off-angles, and based on the fitment or attachment of the apparatus of the present invention comprising a composite material of retro-reflective material which in this case is bonded to a novel corner cube reflector design and application, with unique and specific configurations and geometries of singular or multiple corner reflectors, each apparatus can significantly improve the quality and quantity of raw signal data received by a detecting object (e.g., CAS equipped vehicle) wherein the raw signal data may be comprised of one or more of the following: radar, lidar, visible electromagnetic spectra whereby the raw signal data reflective device (100) will elevate the reflected raw signal data above background noise so the small aspect target is detected and the CAS can react in time to avoid a collision. In a portion of raw signal data which is radar, an amplified RCS return will activate the vehicles collision avoidance system to detect and react providing a warning to the operator and/or the vehicle to avoid collisions with the bicycle or other similar mobility devices. Similarly, in cases where lidar utilizing near infrared, is utilized by the CAS, the portion of raw signal data reflected back to the detecting object is likewise elevated in quantity and quality such that the signal to noise ratio is increased and the otherwise difficult to detect object is detectable by CAS sensors as it is differentiable from the background noise. Similarly, due to the optimized reflectivity of implementations according to the present invention, visible and near infrared spectra is likewise elevated in quantity and quality such that the signal to noise ratio (SNR) is increased and the otherwise difficult to detect object is "seen" by CAS sensors as pronounced beyond the background noise and interference often present in the road environment.

Figure 3:
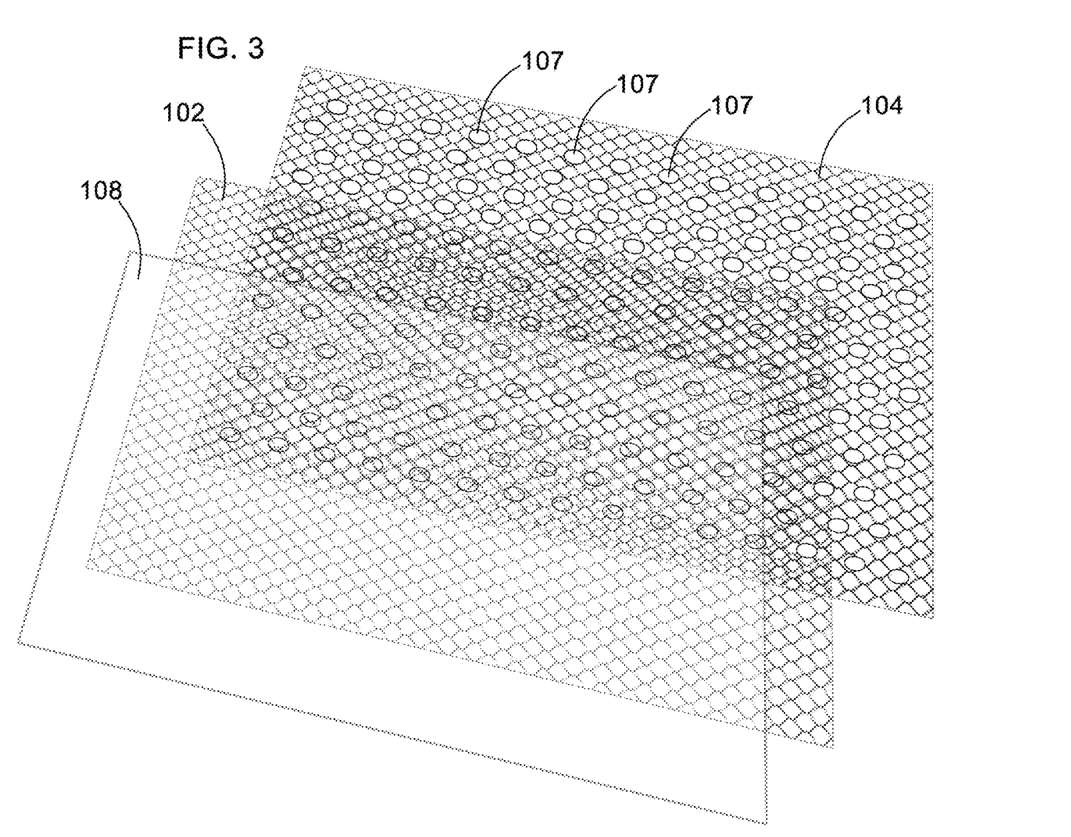
FIG. 3 is a perspective view showing a stacking of various layers of a bonded composite material.

FIG. 3 shows a stacking of various layers of a bonded composite material (101) that includes a bottom layer of a radar reflective surface (108) that may be a separate metalized material or a metalized coating, a first layer (102) of retro-reflective material including micro-prisms (110) which is optimized for visible light spectrum, near infrared spectra or UV spectra, a second layer (104) of retro-reflective material including micro-prisms which is optimized for visible light, and wherein the second layer includes a series of through apertures (107) or perforations that permit light to pass through the second layer (104) to the first layer (102). A translucent layer (106) which may be a coating or applied film may reside atop the second layer for protection from the elements. The foregoing layers may be fused together, thermo-bonded, adhesively bonded or otherwise joined in a general stacked disposition by any manner that may be appreciated by those with skill in the art to form the composite material (101). The apertures may be various shapes; e.g., circles, ovoid, rectangular, irregular shaped and of any size. The apertures are typically disposed in an array of regular rows and columns, but may be arranged in any suitable pattern.

Figure 4:
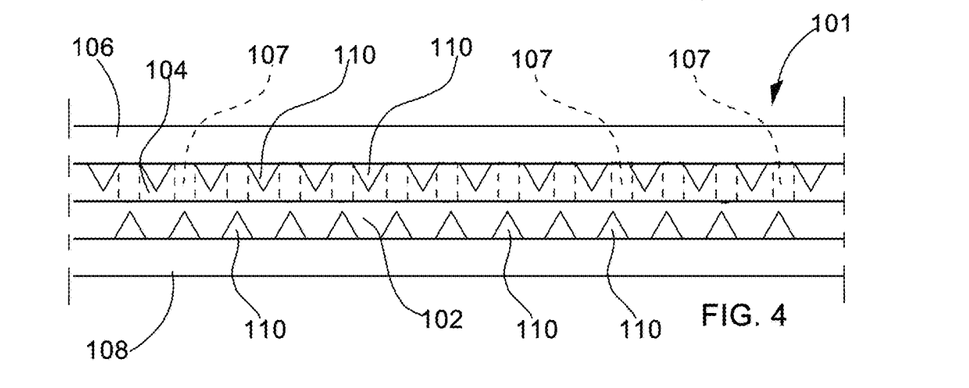
FIG. 4 is a diagrammatic view of the stacked layers of (FIG. 3)

FIG. 4 is a diagrammatic representation not shown to scale, depicting an example stacking configuration for an implementation of a composite material (101) according to the present invention. From the bottom, the composite material includes a radar-reflective surface (108) that may be a film, a flat metal surface or applied coating of a metalized material. Disposed adjacent the radar-reflective surface is a first layer (102) of retro-reflective material with micro-prismatic elements (110). Disposed above the first layer (102) is a second layer of retro-reflective material also with micro-prismatic elements (110), and within the second layer are a series of apertures (107) or perforations that permit light penetration to the first layer. A translucent layer (106) which may be a coating or applied film may reside atop the second layer (104) for protection from the elements. The operative illumination and reflective surfaces or faces of any implementation may be made from the application of a novel hybrid reflective surface where prismatic and metalized materials have been altered and merged into a composite and affixed to a specified geometric surface that optimizes the quality and quantity of raw signal object detection data. Retro-reflective materials optimized for various wavelengths of light spectra may be combined; e.g., visible light, near infrared. The visible and near-infrared light illumination optimization occurs through a combination of altered prismatic retro-reflective film materials overlayed (fused to) a flat metallic surface (substrate) forming a new composite material (prismetallic wafer) that is appended to a polyhedron body surface which is enclosed in a device frame. The radar sensor optimization occurs through application of a highly reflective material such as aluminum, plated or coated plastic or similar materials, or other material known to those with skill in the art including other metals, metal oxides, nickel alloy oxide, and various plastics and metalized plastics including, but not limited to, polycarbonate, ABS, polyamide 12, epoxy, nylon, carbon fiber, etc.

Figures 5, 6:
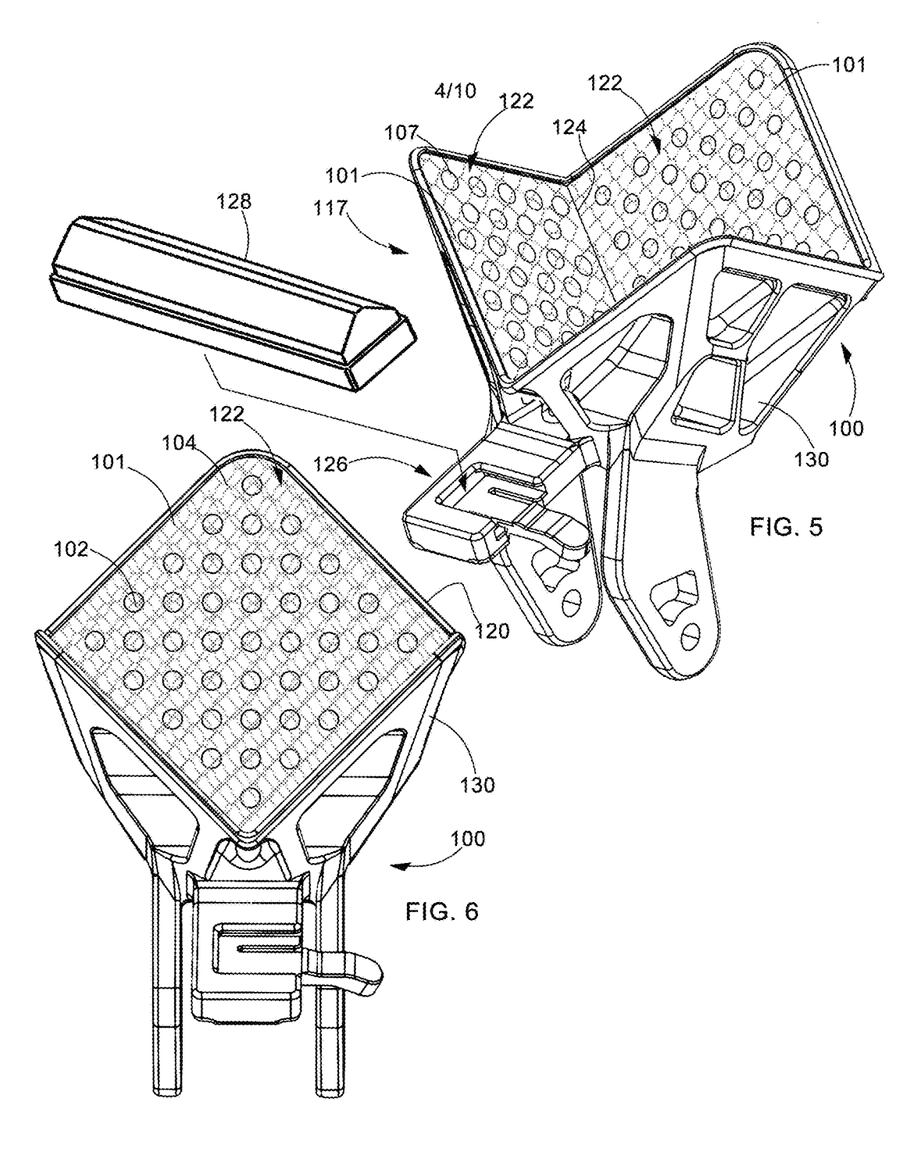
FIG. 5 is an orthographic view of a reflective device including a composite material bonded to a trihedral construction.
FIG. 6 is a front facing view thereof.

FIGS. 5 and 6 show an example implementation of a polyhedral body (116) with a trihedral portion (117) that includes a body (118), edges (120) and vertices (124), and wherein the faces (122) of the trihedral portion (117) include the composite material (101) shown in (FIGS. 3 and 4) which may include application of the composite material to the face by bonding, or in some cases the composite material (101) may be formed into a trihedral shape. Trihedral portion (117) provides reflective capability for detection, measurement, and amplification of the presence of the target object from multiple angles, orientations, distances and ranges to the vehicles collision avoidance system wherein both the quantity and quality of the raw signal data is elevated. Faces (122) meet at a vertex (124) forming an exterior and an interior vertex. The exterior vertex is convex whereas the interior vertex is concave. Other polyhedral designs and configurations and arrays, including additional triangular trihedral reflectors on each side of device (100) to collectively provide up to 180 degrees of reflective capability, could be used without departing from the spirit of the invention. The square trihedral reflector may include plastics, metals, composites, aluminum, metal plated plastics, metal or metal infused tapes, metallic coatings, polyamide 12, and metal oxides. The construction may be employed singly as shown, or in some cases multiple trihedral portions (117) maybe disposed in an array. Various conventional light reflecting elements (128) may be mounted to the device as shown.

Figure 7:
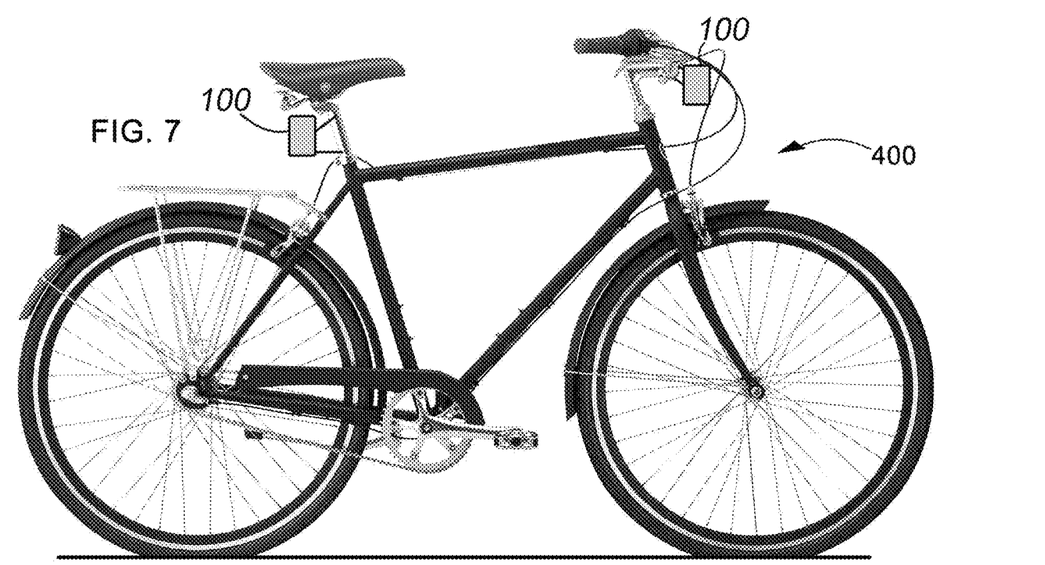
FIG. 7 shows an application of an embodiment according to the present invention wherein reflective devices are placed on a bicycle.
Figure 8:
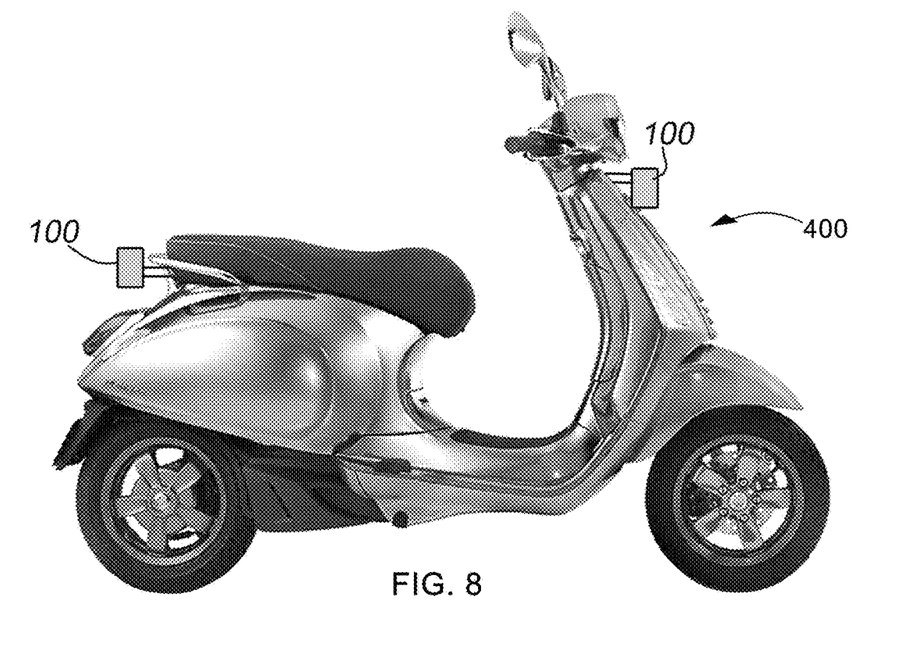
FIG. 8 shows an application of an embodiment according to the present invention wherein reflective devices are placed on a motor scooter or motorcycle type vehicle.
Figure 9:
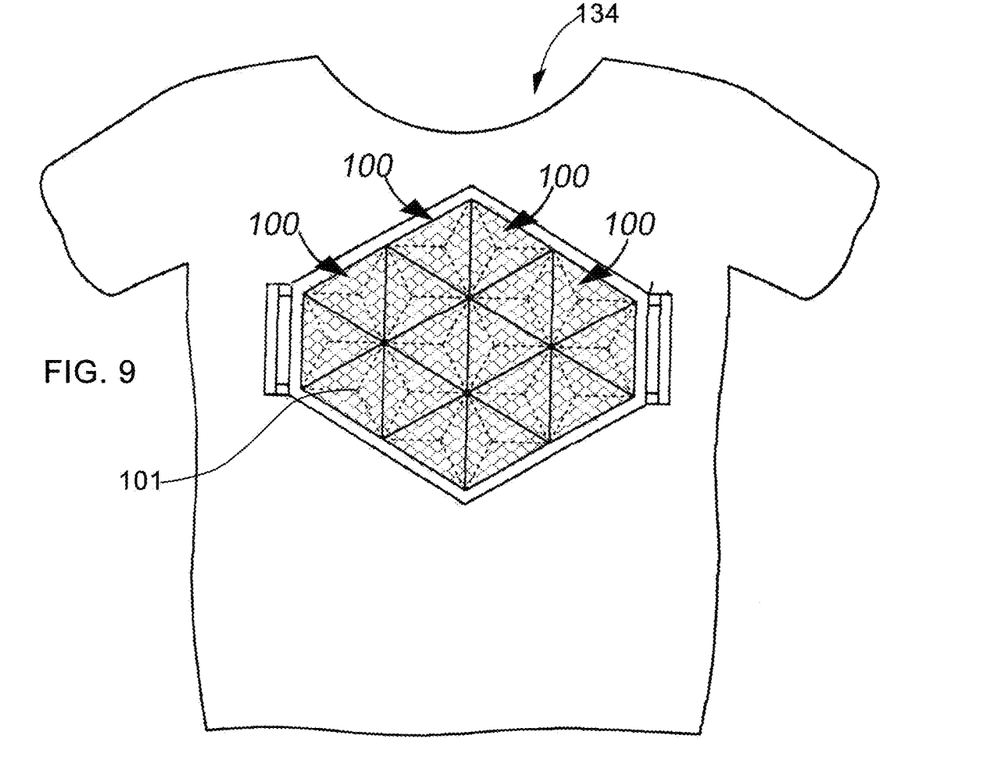
FIG. 9 shows an article of apparel with a reflective device embedded in or applied to its surface.
Figure 10:
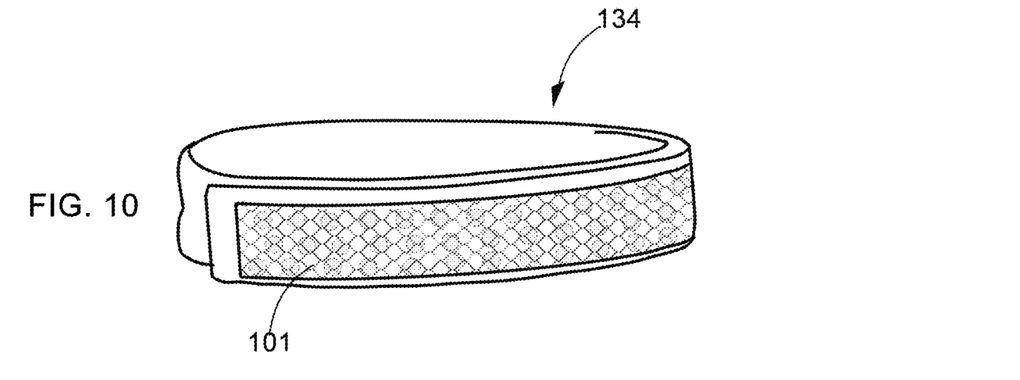
FIG. 10 shows an wearable bracelet or arm band/leg band with a reflective device embedded in or applied to its surface.
Figure 11:
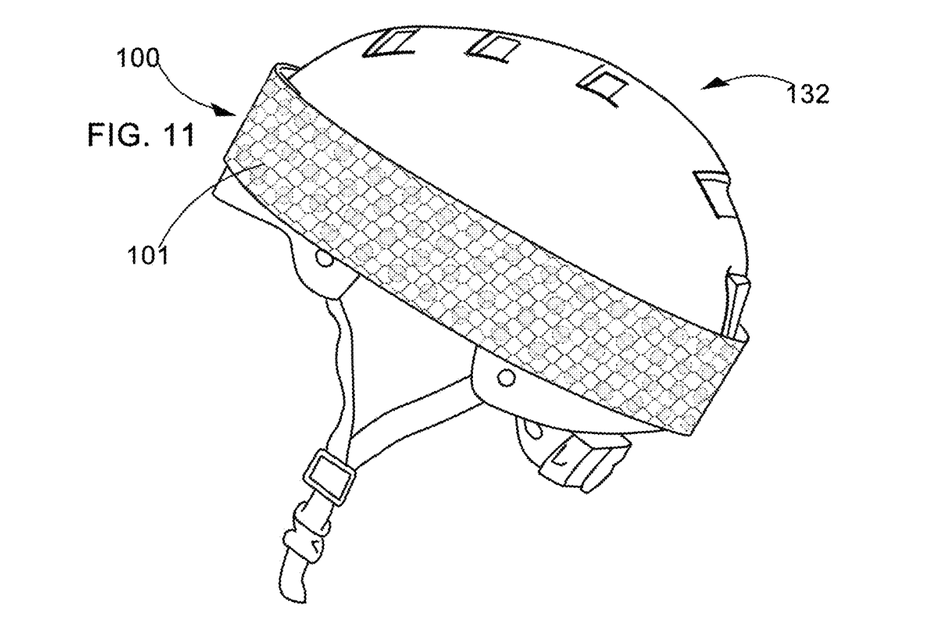
FIG. 11 shows a bicycle helmet with a circumferentially applied reflective device.
Figure 12:
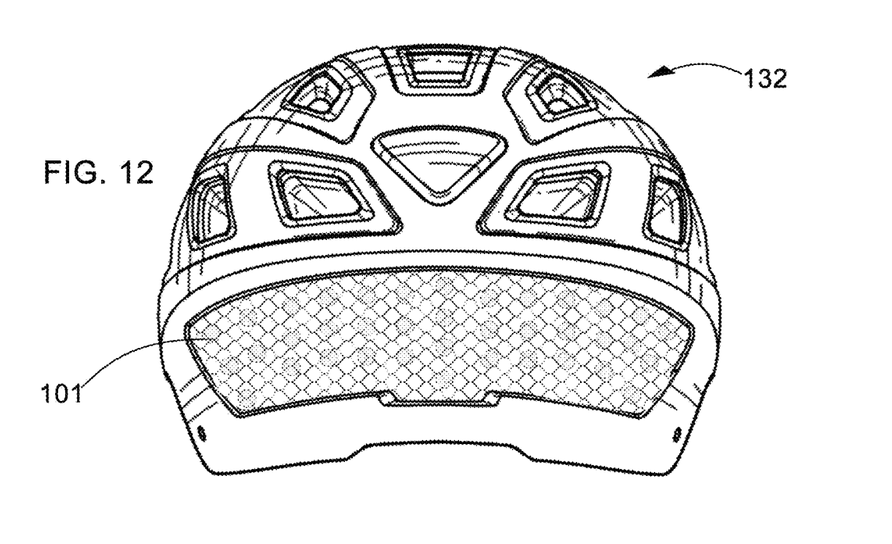
FIG. 12 shows a bicycle helmet with a rear facing reflective device embedded in or applied to its surface.

FIGS. 7 and 8 show applications of various implementations according to the present invention wherein a reflective device (100) is mounted to the front and rear of a small aspect ratio object like bicycles and motor scooters and may also include motorcycles and e-bikes.

FIGS. 9-12 show wearable articles (134) such as a shirt, bracelet, arm band/leg band and bicycle helmets (132) to which various implementations have been embedded in or applied to their surfaces.

Figure 13:
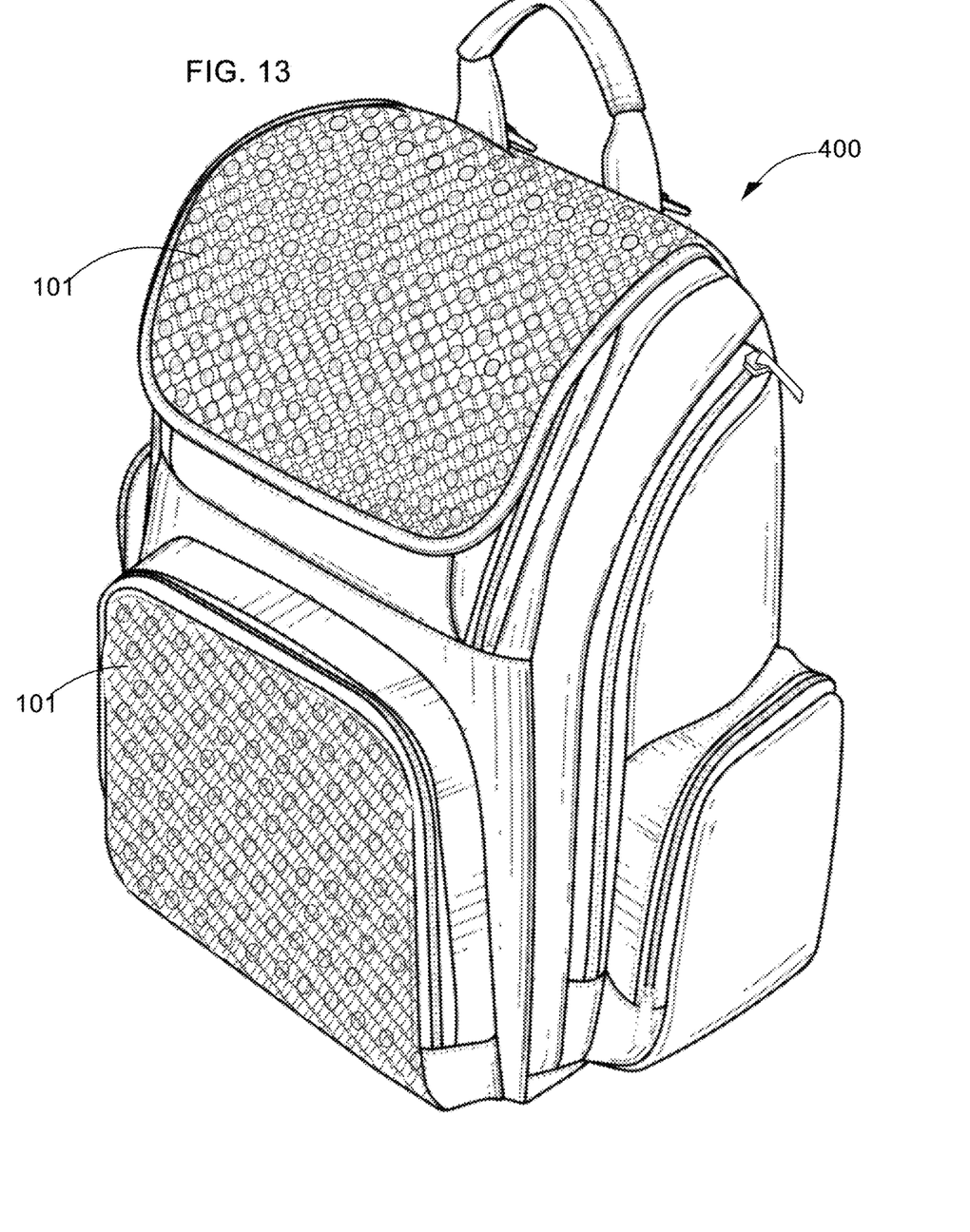
FIG. 13 is a backpack with flexible composite material defining a reflective device embedded in or applied to its surface.

FIG. 13 shows an application that includes a backpack to which various implementations have been embedded in or applied to its surfaces.

Figure 14:
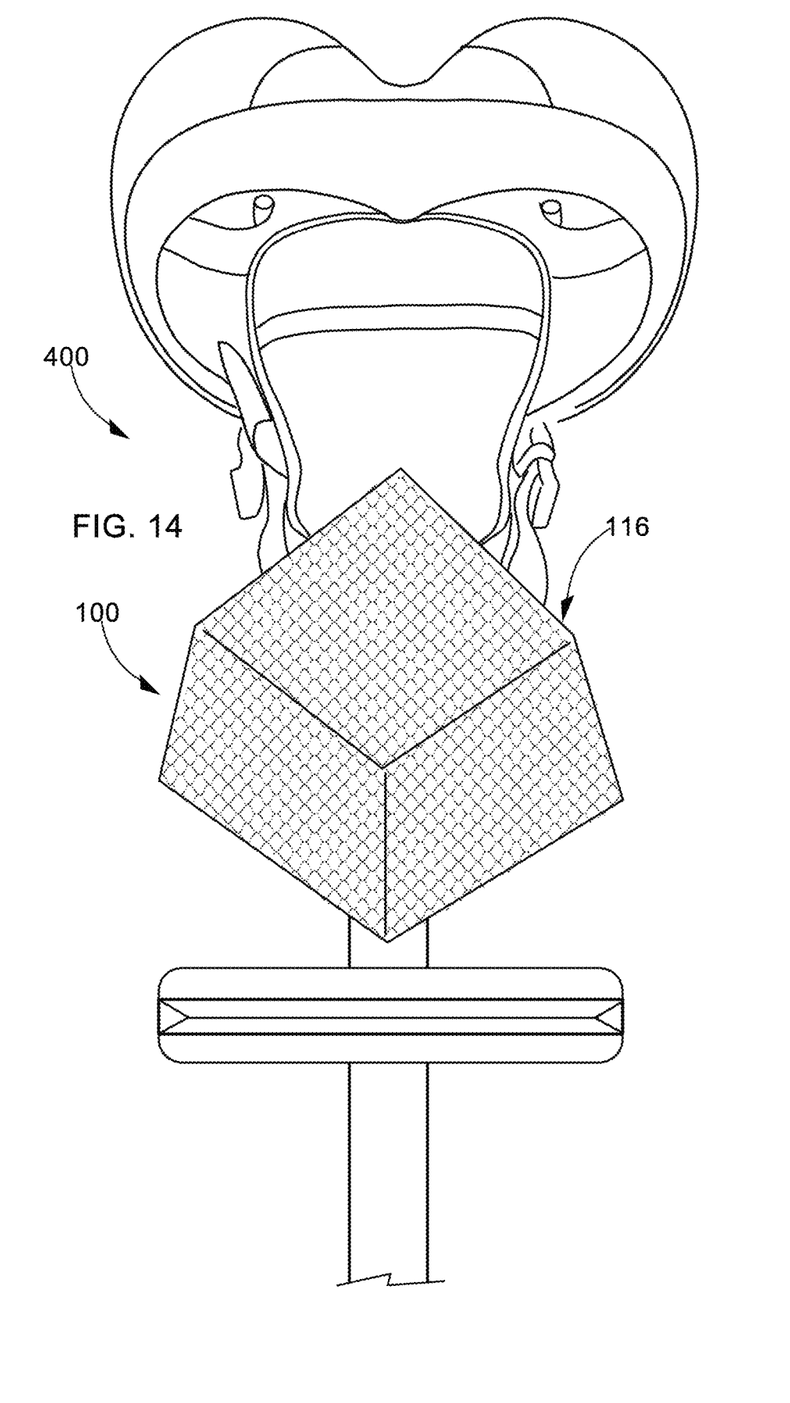
FIG. 14 shows the rear of a bicycle with a trihedral type reflector mounted behind the seat.

FIG. 14 shows a seat post of a bicycle to which a polyhedral construction (116) has been mounted to the rear of the seat. In other applications, the polyhedral construction may be mounted to the handlebars or other portions of the bicycle.

Figure 15:
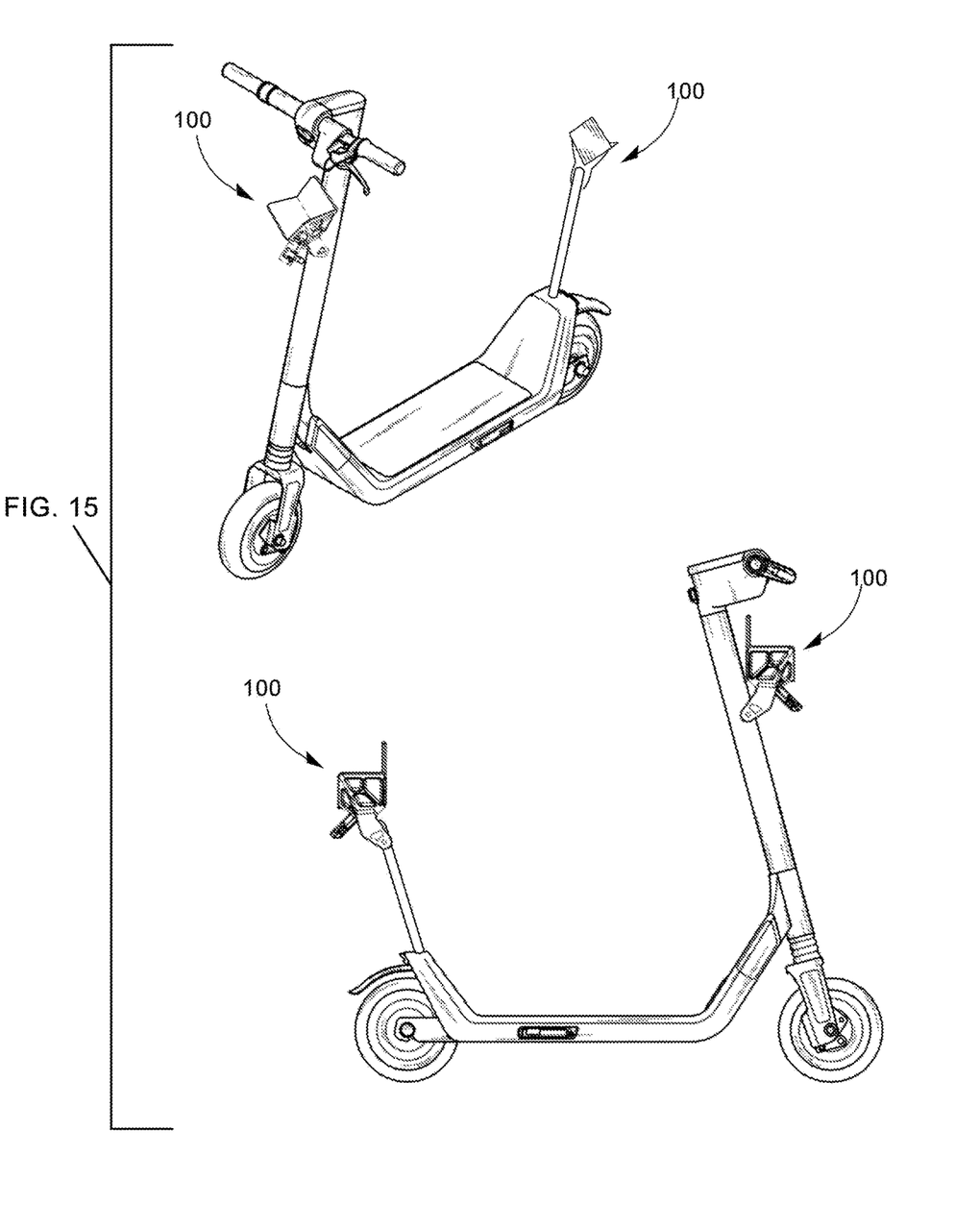
FIG. 15, in perspective and side views depict an E-scooter equipped with an implementation according to the present invention.

FIG. 15 shows an application where a polyhedral construction (116) has been mounted to the front and or rear post of an E-scooter.

Implementations according to the present invention can be adapted to numerous mounting schemes including: to a bike frame; seat post; handlebar; fenders, or other similar placements; and to human extremities like arms and legs; and to equipment like arm bands; leg bands; headbands; helmets; caps; backpacks; attached to clothing or fabric; or, otherwise embedded into a target object. The mounting position is important in that it establishes the alignment of each the vertex of the apparatus of the present invention in the general direction of the vehicles collision avoidance system to allow maximum exposure to the incoming raw signal data at multiple angles, orientations, ranges and distances. Additionally, mounting the present invention as a device on the handlebars or some other frontal or side orientation of the small aspect target will allow detection from vehicles approaching from the front or side angles of the vehicle with a collision avoidance system without departing from the spirit of the invention.

It should be understood that the drawings and detailed description herein are to be regarded in an illustrative rather than a restrictive manner and are not intended to be limiting to the particular implementations, forms and examples disclosed. In the above-described embodiments and implementations, the size, shape and the like shown in the accompanying drawing figures can be adjusted and still remain within the scope of this disclosure. Accordingly, it is intended that this disclosure encompass any further modifications, changes, rearrangements, substitutions, alternatives, design choices, and implementations as would be appreciated by those of ordinary skill in the art having benefit of this disclosure, and falling within the spirit and scope of the following claims.

What is claimed is:

1. An apparatus to increase the detectability of small aspect ratio target objects including at least cyclists, pedestrians, and other vulnerable road users, the apparatus comprising:
   a flat layer of radar reflective metallic substrate;
   a composite material including:
      a flat first layer of radar transmissive, optically reflective material comprising retro-reflective film adapted for night reflectivity and illumination, wherein the flat first layer is bonded directly to the flat layer of radar reflective metallic substrate,
      a flat second layer of radar transmissive, optically reflective material comprising retro-reflective film directly atop the flat first layer, and
      a flat radar transmissive and optically translucent layer directly atop the flat second layer; and a plurality of apertures within the flat second layer permitting passage of photons from the flat translucent layer to the flat first layer, wherein the plurality of apertures are only within the flat second layer and are not within the flat first layer and are not within the flat radar transmissive and optically translucent layer, and wherein a combination of the flat first layer and the flat second layer and the flat layer of radar reflective metallic substrate provide reflectivity to increase the detectability of the small aspect ratio target objects.

2. The apparatus according to claim 1, wherein the flat first layer of radar transmissive, optically reflective film includes a first plurality of micro-prismatic elements and the flat second layer of radar transmissive, optically reflective film includes a second plurality of micro-prismatic elements, wherein the first plurality of micro-prismatic elements are arranged to coincide with the plurality of apertures within the flat second layer permitting the passage of photons from the flat translucent layer to the flat first layer for incidence on the first plurality of micro-prismatic elements.

3. The apparatus according to claim 1, wherein the composite material conforms to a polyhedral body, the polyhedral body including a square trihedral corner cube reflector configured to provide both illumination and reflective capability for a raw signal data such that a quality and quantity of the raw signal data is elevated to distinguish a presence of the small aspect ratio target objects from electromagnetic and environmental interference that produces return signal degradation and noise.

4. The apparatus according to claim 1, wherein the plurality of apertures define a perforation pattern.

5. The apparatus according to claim 1, wherein the composite material is capable of providing reflective and illumination capability for at least radar, ultraviolet spectra, visible spectra, near infrared light spectrum.

6. A system to increase a detectability of a small aspect ratio target object including at least a cyclist, a pedestrian, or another vulnerable road user, the system comprising:

a composite material including a first layer of retro-reflective film adapted for night reflectivity and illumination and having micro-prismatic elements therein, a second layer of retro-reflective film directly atop the first layer, and a translucent layer directly atop the second layer;

a plurality of apertures only within the second layer and permitting a passage of photons to the micro-prismatic elements of the first layer;

a radar reflective metallic substrate material directly attached to the first layer;

wherein enhanced raw signal data reflected from the composite material is detectable by at least one electronic sensor on a detecting object configured to receive the raw signal data, the at least one electronic sensor integrated with a computing processor, the processor configured to evaluate the raw signal data reflected from the composite material and thereby detect, measure, and amplify a presence of the small aspect ratio target object, and wherein the radar-reflective metallic substrate material forms a portion of at least one polyhedral body, and each of the at least one polyhedral body includes a square trihedral corner cube reflector configured to provide both illumination and reflective capability of electromagnetic spectra for detection, measurement, and amplification of the presence of the small aspect ratio target object.

7. The system according to claim 6, wherein the first and second layers of retro-reflective film include micro-prismatic elements.

8. The system according to claim 6, wherein the plurality of apertures define a perforation pattern.

9. The system according to claim 6, wherein the composite material is capable of providing illumination and reflective capability for at least one of the following: microwave including radar, ultraviolet spectra, visible light, and or near infrared light.

10. The system according to claim 6, wherein the raw signal data is transmitted including at least one of the following: radar, (microwave) ultraviolet, visible light spectrum or near infrared light spectrum to optimize object detection for radar, camera-vision and lidar sensor modalities.

11. The system according to claim 6, wherein the composite material is adapted to attach to or be embedded in an object, the object configured to elevate a quantity and quality of the raw signal data reflected back to the detecting object.

12. A method for the production and evaluation of raw signal data to detect, measure, and amplify a presence of a small aspect ratio target object comprising the steps of:

providing a composite material including a radar reflective metallic surface, a first layer of retro-reflective film directly atop the radar reflective metallic surface adapted for night reflectivity and having micro-prismatic elements therein, a second layer of retro-reflective film directly atop the first layer, and a translucent layer directly atop the second layer, and, a plurality of through apertures only within the second layer, each aperture defining a passageway for photons to the micro-prismatic elements of the first layer;

conforming or bonding the radar reflective metallic surface of the composite material to at least one polyhedral construction, the at least one polyhedral construction including a square trihedral corner cube reflector configured to provide both illumination and reflective capability for detection, measurement, and amplification of the presence of the small aspect ratio target object by at least one detecting object; and, attaching the at least one polyhedral construction to the small aspect ratio target object.

13. The method according to claim 12 further comprising the step of receiving an electromagnetic wave signal from the at least one detecting object, the electromagnetic wave signal reflectable from the at least one polyhedral construction attached to the small aspect ratio target object.

14. The method according to claim 12 further comprising the step of receiving one or more electromagnetic spectra reflectable from the at least one polyhedral construction attached to the small aspect ratio target object, wherein the one or more reflected spectra from the at least one polyhedral construction includes at least one of the following: microwave spectrum including radar, ultraviolet spectrum, visible light spectrum, near infrared light spectrum.

15. The method according to claim 12 further comprising the step of processing reflected spectra from the at least one polyhedral construction and detecting, measuring, and amplifying the presence of the small aspect ratio target object such that illumination and reflective raw signal data defines a small aspect ratio target object signature sufficient to detect the small aspect ratio target object from background noise, environmental noise and interference that produces return signal degradation.

16. The method according to claim 12 further comprising the step of providing a protective framework around the at least one polyhedral construction.

17. The method according to claim 12, wherein the at least one polyhedral construction is comprised of a plurality of polyhedral portions.

18. An apparatus to increase a detectability of a target object, the apparatus comprising:
- a polyhedral body attachable to the target object and comprising a trihedral portion that includes faces that are flat planes;
- a flat layer of radar reflective metallic substrate bonded to at least one face of the faces of the trihedral portion that are flat planes;
- a flat first layer of radar transmissive, optically reflective material comprising retro-reflective film adapted for night reflectivity and illumination, wherein the flat first layer is bonded directly atop the flat layer of radar reflective metallic substrate;
- a flat second layer of radar transmissive, optically reflective material comprising retro-reflective film bonded directly atop the flat first layer, and
- a flat radar transmissive and optically translucent layer bonded directly atop the flat second layer,
- wherein the flat second layer comprises a plurality of apertures defined through the flat second layer and permitting passage of photons from the flat radar transmissive and optically translucent layer to the flat first layer,
- wherein the plurality of apertures are only within the flat second layer and are not within the flat first layer and are not within the flat radar transmissive and optically translucent layer, and
- wherein the flat first layer comprises a plurality of micro-prismatic elements arranged to at least partially coincide with the plurality of apertures within the flat second layer permitting the passage of photons from the flat radar transmissive and optically translucent layer to the flat first layer for incidence on the plurality of micro-prismatic elements and reflection thereby to increase the detectability of the target object.

* * * * *